Jan. 12, 1965   P. J. HATCH   3,165,002
SPEED REDUCING MECHANISM
Filed March 26, 1963   2 Sheets-Sheet 1
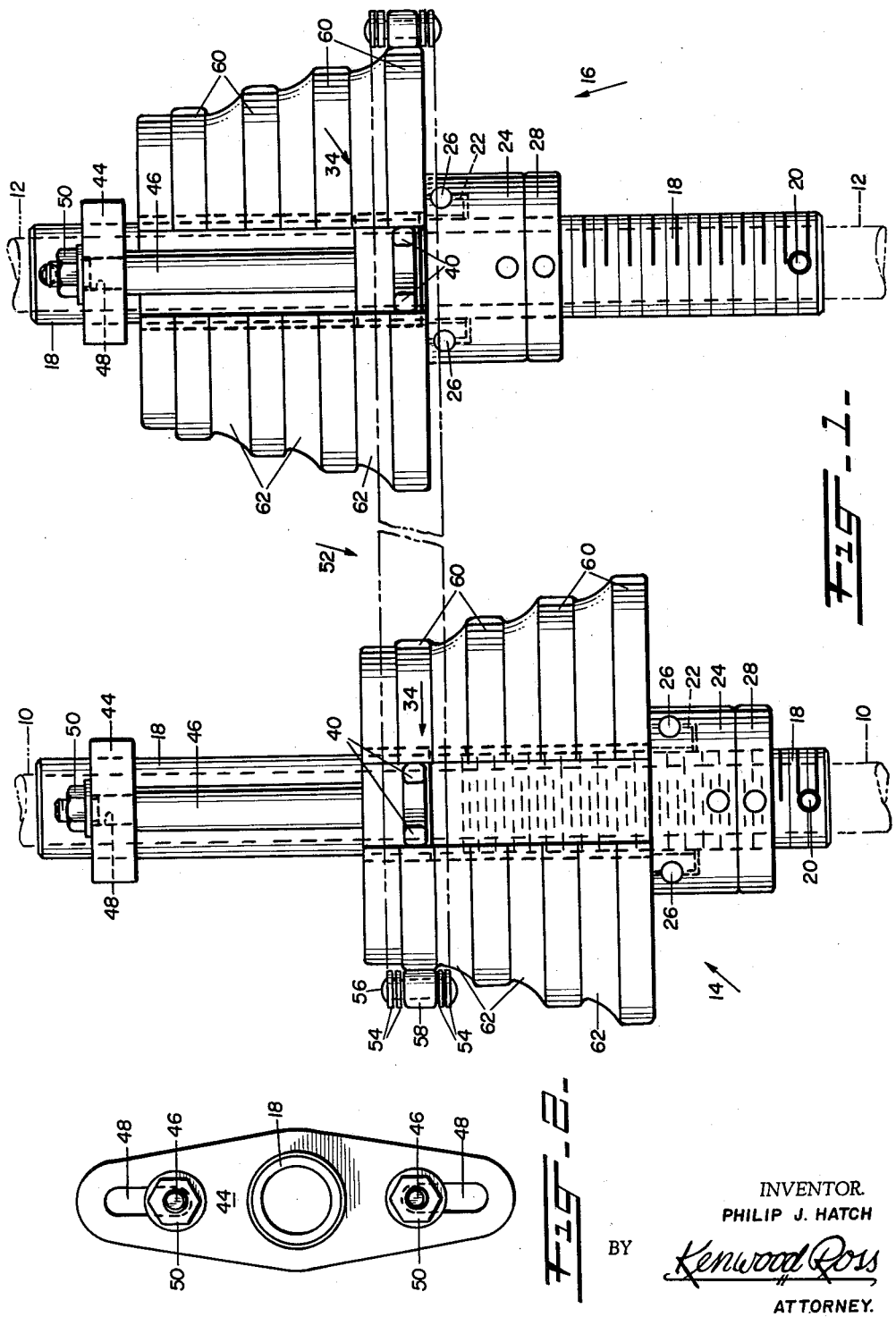
INVENTOR.
PHILIP J. HATCH
BY Kenwood Ross
ATTORNEY.

Jan. 12, 1965 P. J. HATCH 3,165,002
SPEED REDUCING MECHANISM
Filed March 26, 1963 2 Sheets-Sheet 2
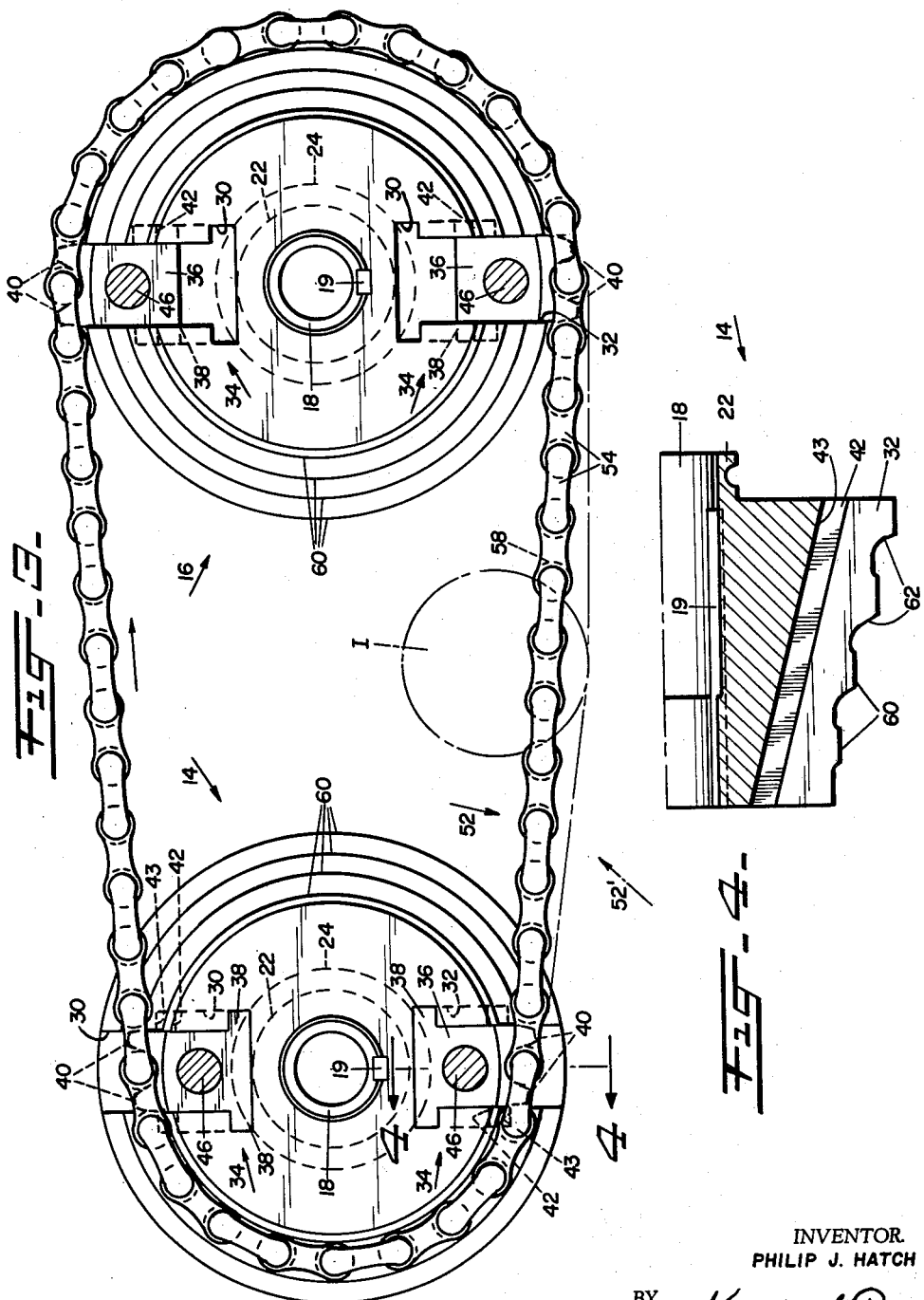
INVENTOR.
PHILIP J. HATCH
BY Kenwood Ross
ATTORNEY.

United States Patent Office 3,165,002
Patented Jan. 12, 1965

3,165,002
SPEED REDUCING MECHANISM
Philip J. Hatch, 312 Westfield Road, Holyoke, Mass.
Filed Mar. 26, 1963, Ser. No. 268,051
1 Claim. (Cl. 74—217)

This invention relates to improvements in variable speed devices which comprehends new and novel arrangements of a primary sprocket having a pair of chain engaging and guiding means slidably associated therewith, which primary sprocket is mounted on a driving or input shaft, and a secondary sprocket having a pair of chain engaging and guiding means slidably associated therewith, which secondary sprocket is mounted on a driven or output shaft, and an endless chain of standard type meshable with the teeth of the chain engaging and guiding means of the primary and secondary sprockets.

As the driving or input shaft rotates at one rotative speed, the primary sprocket is driven therewith in rotating movement to motivate the endless chain and thereby the secondary sprocket with the driven or output shaft being rotated accordingly, but at another rotative speed.

Primarily, the invention envisions means by which the relative speeds of the input and output members may be varied at will to suit specific operating needs.

In the drawings accompanying this disclosure:

FIG. 1 is a broken top plan view of a simplified speed changing mechanism teaching the concept of the invention;

FIG. 2 is a side elevational view of the tooth positioning means of the mechanism of the invention;

FIG. 3 is a side elevational view of the speed changing mechanism of FIG. 1, with parts removed for purposes of clarity; and FIG. 4 is a sectional view taken substantially on the line 4—4 of FIG. 3.

Whereas in the drawings and in the following disclosure, the input and output shafts are referred to as being disposed in a horizontal plane, same is merely for purposes of orientation, it being understood that they may be otherwise disposed. Likewise for ease of reference only, the so-called front of the apparatus is identified as that side adjacent the bottom of the sheet containing FIG. 1, it being understood that the apparatus may be otherwise disposed.

With continued reference to the drawings, numerals 10 and 12 represent the driven (output) and driving (input) shafts respectively, upon which are mounted, respectively, a primary sprocket, generally indicated by 16, and a secondary sprocket, generally indicated by 14. As the sprockets and their associated chain engaging and guiding mechanisms are alike and are operated in the same manner, the description to follow will be limited to one of said sprockets and its cooperant chain engaging said guiding mechanism.

Further because of this identicalness, it is immaterial as to which shaft represents input and which output; the shafts 10 and 12 have been designated as driving (or input) and driven (or output), respectively, as aforesaid, but merely for purposes of orientation.

The apparatus is envisioned as being adapted, if desired, for ready application to existing shafts, with the sprockets hereof being sleevable thereupon.

Means for imparting rotative motion to the driving or input shafts is not shown, same not forming a part of the present invention, it being understood that any suitable means may be employed.

Each said sprocket is inclusive of an inner sprocket tube or sleeve 18 extending longitudinally therethrough and centrally thereof, said sprocket tube being coaxially disposed relative to its respective sprocket and being keyed thereto as by a longitudinally-extending driving key 19 whereby rotation of the sprocket tube drives the sprocket through the driving key. Each sprocket tube is slideably receivable on its respective shaft 10 or 12 and is fixed to said shaft as by pins or set screws 20 or equivalent.

In the event that existing shafts are exploited, the feature of sleeving the sprocket tubes thereover comprehends obviation of a need for the usual bearing means.

A concentrically-arranged hub 22, unitary with and extending outwardly from the forward vertical face of a sprocket, has an opening extending therethrough, which opening is coaxial with and communicative with the sprocket tube opening of the sprocket, with the associated sprocket tube 18 being extended therethrough whereby the sprocket and integral hub may be moved axially and slidably relative to said sprocket tube.

A spanner nut 24, circumscribing hub 22 and threadably engaged with sprocket tube 18 over which it is sleeved, is keyed to said hub as by pins 26 receivable in an aligned circumferential groove provided in the hub. Said spanner nut and said hub move axially unitarily.

A lock nut 28 may also be provided for threaded engagement with sprocket tube 18 to insure securement of the sprocket in a desired fixed position relative to the sprocket tube.

By loosening lock nut 28 and rotating spanner nut 24, the sprocket may be moved longitudinally relative to the main axis of tube 18, for purposes as will appear.

A pair of longitudinally and inwardly-extending, diametrically-opposed, generally T-shaped grooves or slots 30 and 32, best seen in FIGS. 3 and 4, are provided on the outer surface of the sprocket.

These grooves of the pair are angularly disposed and extend throughout the entire longitudinal extent of the sprocket and are adapted to receive therewithin, in a slidable manner, the chain engaging and guiding means of the invention.

Said chain engaging and guiding means, which are identical in configuration, are generally indicated by 34 and are each formed from flat stock to assume a generally T-shape, substantially complemental to that of the respective grooves 30 and 32.

Each such chain engaging and guiding means 34 comprises a flat, upstanding, centrally apertured body 36 having laterally-disposed oppositely-facing shoulders 38 at its inner end and, at its outer end, being so recessed centrally of its end face as to allow a pair of spaced transversely-extending outwardly-facing teeth 40, 40.

The shoulders 38 serve as limit means, limiting outward movement of said chain engaging and guiding means upon contact with a pair of spaced, parallel, longitudinally-extended guide bars 42, 42 angularly disposed in the grooves 30 and 32 and fixed to complemental, longitudinally-extending, angularly-disposed shoulders 43 provided in said grooves.

By such construction, the sprocket is movable longitudinally and axially relative to the chain engaging and guiding means or vice versa, and said chain engaging and guiding means is movable transversely and radially relative to said sprocket, all in manner and for purposes as will appear.

The guide bars 42 of the pairs preclude any unwanted lateral shifting of the chain engaging and guiding means when its respective sprocket is rotated.

Position-securing means for insuring against any shifting in the radial and axial positions of the chain engaging and guiding means relative to the sprocket, comprises a transversely-extending bracket 44 fixed to the tube 18 and disposed rearwardly of the sprocket in spaced relation thereto, and linked to said chain engaging and guiding means by a pair of spaced, parallel and longitudinally forwardly-extending rods 46, each fixed at one end in the opening provided in each said chain engaging and guiding means and each extending through one of the axially-aligned spaced longitudinally-extending slots 48, 48 in said bracket at its opposite end.

The positioning means prevents any circumferential play of the chain engaging and guiding means and insures that same remain at a desired pre-set height to hold the cooperant chain in desired position.

A nut 50 is threadedly engaged with the end of each said rod adjacent the bracket 44 wherefore the rods may be adjustably fixed in position relative to the bracket.

By loosening the nuts 50, the rods 46, and the chain engaging and guiding means 34 fixed thereto, may be moved radially relative to the sprocket, with the rods 46 being slideable within the slots 48 and the chain engaging and guiding means 34 being radially slideable in the grooves 30 and 32 of the sprocket, it being understood that the bracket 44 remains stationary during this movement, it being fixed to the tube 18.

The pairs of chain engaging and guiding means 34 provided on each sprocket are adapted to coact with a chain of standard construction. Said chain is generally indicated by 52 and comprises a plurality of links 54, each said link being pivotally connected to an adjacent link as by a pivot pin 56, and each said pin having a roller 58 sleeved thereon. Such chain construction is well known in the art and reference is made thereto only for purposes of explanation.

The teeth 40 of the chain engaging and guiding means 34 are contained by the links 54 of the chain with the rollers 58 meshing with said teeth wherefore driving of the chain is effectuated.

The outer periphery of each of the sprockets is stepped to provide a progression of spaced, parallel annular ramps 60 of successively decreasing diameter, each said ramp being connected to the adjacent ramp as by an annular slideway 62, said slideways being generally arcuate in cross section.

The diameter of each ramp 60 will be such as to correspond to the diameter required for a calculated number of teeth needed in imparting a desired speed of rotation.

The chain 52 will be so disposed relative to the sprockets 14 and 16 as to be rollable over the ramps 60, with the speed of the output or driven shaft 10 being determined by the particular combination of steps or ramps used between the sprockets, all in known manner.

The movable chain engaging and guiding means 34 make it possible to employ the same chain, without alteration of its length, regardless of the speed ratio selected, it being understood that in the operation of the sprockets, no axial movement of the chain takes place.

By moving the chain engaging and guiding means radially inwardly or outwardly, relative to the sprockets, chain and sprocket contact will always be maintained, regardless of the particular ramps upon which the chain may be employed, and all without necessitating any alteration of the chain length.

The arcuate slideways between the ramps facilitate the movement of the chain from one ramp to another when it is desired to effectuate speed ratio changes. These slideways are best seen in FIG. 4, wherein the chain engaging and guiding means has been omitted for purposes of clarity.

The speed ratio of my construction is variable only when the apparatus is disengaged or non-operative and is not variable under load. The speed is set by moving the sprockets axially relative to the shafts, thereby moving the chain engaging and guiding means radially and axially relative to the sprockets.

In operation, the driving shaft 12 is rotated to motivate sprocket 16 and chain 52, with the teeth 40 of the chain engaging and guiding means 34 meshing with the links of the chain 52 to impart a rotative movement to sprocket 14 and driven shaft 10.

It will be understood that the chain remains in the same horizontal plane (or vertical plane, as the case may be) at all times during operation of the variable speed device hereof.

In effect, speed ratio changes are obtained by the expedient of varying chordal spacing of teeth. Radial movement of the pairs of chain engaging and guiding means on each sprocket varies the chordal distance between the teeth of each said chain engaging and guiding means whereby the desired speed ratio change is effectuated. It will be appreciated that adjustment can be made only when one of the teeth of each chain engaging and guiding means is not engaged with the chain.

The varying of chordal distances is permitted by reason of the slideable relationship between each chain engaging and guiding means and its respective sprocket.

Where high inertia loads are being worked, and increased speed ratios are involved, it may be desirable to employ supplementary devices, such as an idler or the like. Such an arrangement is shown in phantom in FIG. 3 wherein an idler I is disposed on the slack side of a chain 52, the number of speed ratio combinations being increased while requiring movement of only one of the sprockets.

Too, if an idler is employed, one of the variable speed pulleys of the invention may be used in combination with a pulley of standard construction.

In the simple device illustrated, drive is accomplished by the pair of chain engaging and guiding means which are slideably related to each sprocket. In each said chain engaging and guiding means, two teeth are provided, each functioning as a driver. Two such teeth are employed, in preference to one centrally-located tooth, in comprehension of a wider range of diameters being accommodated therewith.

It will also be appreciated that my variable speed device is equally adapted for a timing belt as well as a chain.

I claim:

A speed-changing device for use with an endless power-transmitting chain operatively disposed around parallel input-driving and output-driven shafts and comprising: an input driving shaft tube sleeved and fixed upon the input driving shaft, an output driven shaft tube sleeved and fixed upon the output driven shaft, a sprocket sleeved upon and keyed to each respective said tube for the axial positioning of the respective said sprocket relative to its respective shaft, each said sprocket having a series of annular ramps of successively-decreasing diameter spaced longitudinally of the outer periphery thereof, each said sprocket having a pair of diametrically-opposed slots extending from end to end thereof, a pair of chain engaging and guiding means carried by each said sprocket and each slideable within one of the slots of said sprocket and each incorporating teeth portions extending outwardly of the ramps for meshing with the power-transmitting chain, means for moving each said chain engaging and guiding means longitudinally and transversely relative to the axis of rotation of the respective said shaft, said sprockets being interconnected by the power-transmitting chain, said chain engaging and guiding means being connected to and constructed to compel the simultaneous adjustment of said sprockets whereby as the input-driving shaft rotates at one rotative speed, its said sprocket is driven therewith in rotating movement to motivate the power-transmitting chain and thereby said sprocket with the output-driven shaft being rotated accordingly but at another rotative speed.

References Cited by the Examiner

UNITED STATES PATENTS

| | | | |
|---|---|---|---|
| 1,160,414 | 11/15 | Kelsey | 74—244 |
| 1,645,270 | 10/27 | Winters. | |
| 2,012,399 | 8/35 | Molinelli | 74—244 XR |
| 2,745,291 | 5/56 | Michie. | |

FOREIGN PATENTS

| | | |
|---|---|---|
| 1,186,656 | 2/59 | France. |
| 194,018 | 11/06 | Germany. |
| 222,760 | 1/08 | Germany. |
| 13,725 | 1901 | Great Britain. |

DON A. WAITE, *Primary Examiner*.